T. W. S. HUTCHINS, L. HARGREAVES & A. C. DUNNINGHAM.
PROCESS FOR THE MANUFACTURE OF SODIUM THIOSULFATE.
APPLICATION FILED AUG. 18, 1916.
1,219,819. Patented Mar. 20, 1917.
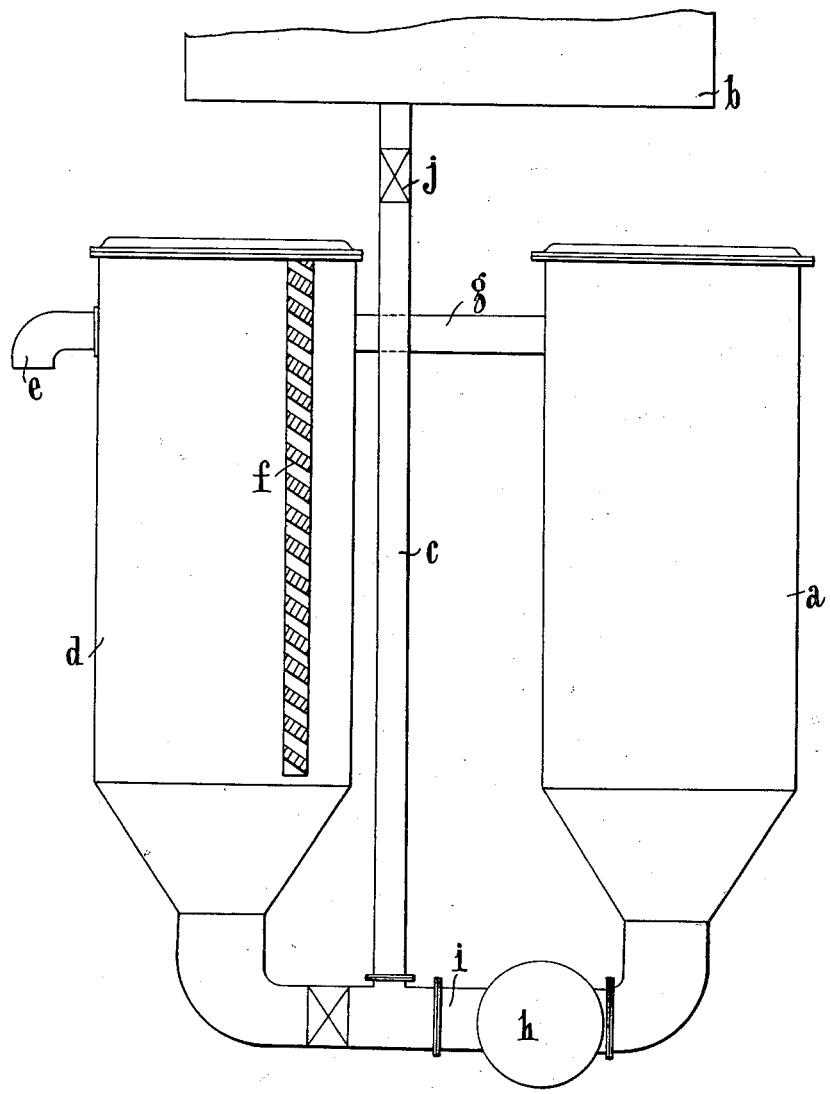
Inventors:
Thomas W. S. Hutchins,
Luke Hargreaves,
Alfred C. Dunningham,
by Spear, Middleton, Donaldson & Spear
Attys.

UNITED STATES PATENT OFFICE.

THOMAS WILLIAM STAINER HUTCHINS, LUKE HARGREAVES, AND ALFRED CHARLES DUNNINGHAM, OF MIDDLEWICH, ENGLAND.

PROCESS FOR THE MANUFACTURE OF SODIUM THIOSULFATE.

1,219,819.     Specification of Letters Patent.     Patented Mar. 20, 1917.

Application filed August 18, 1916. Serial No. 115,620.

*To all whom it may concern:*

Be it known that we, THOMAS WILLIAM STAINER HUTCHINS, LUKE HARGREAVES, and ALFRED CHARLES DUNNINGHAM, D. Sc., all of Electro Bleach & By-Products Limited, Middlewich, Cheshire, England, subjects of the King of Great Britain and Ireland, and residents of Middlewich, Cheshire, England, have invented certain new and useful Improvements in the Processes for the Manufacture of Sodium Thiosulfate, of which the following is a specification.

This invention relates to the manufacture of sodium thiosulfate by the action of sulfur upon sodium sulfite, and has for its principal objects to avoid the costly process of concentration by evaporation of the thiosulfate solution necessary at present to secure commercial separation by crystallization, to otherwise simplify and reduce the cost of production and to readily secure the elimination of the common impurities in the reagents employed.

We have found that sodium sulfite is practically insoluble in a solution of sodium thiosulfate of high concentration namely, a concentration sufficient to enable separation to take place by crystallization. Further, we have found that in hot concentrated solutions of sodium thiosulfate practically all the troublesome impurities usually occurring in the commercial reagents are insoluble and do not interfere with the reaction.

The invention consists broadly in proportioning the sulfur and sodium sulfite together with water accompanying them or added in such a way as to form by suitable digestion a sodium thiosulfate solution sufficiently concentrated, without evaporation, to allow of commercial separation by crystallization.

The invention further consists in accelerating the reaction by the use of a large excess of either or both of the sodium sulfite and sulfur reagents, so that hot concentrated solutions result in a short time and enable impure reagents to be employed.

The invention also consists in employing an excess of the sulfite and sulfur alternately to enable the removal of soluble and insoluble impurities alternately and prevent loss of reagents.

The invention also consists in the production of sodium thiosulfate by a continuous process, comprising passing a hot saturated solution of sodium sulfite through an intimate mixture of solid sodium sulfite and sulfur.

The invention also consists in combining the sodium bisulfite producing process of our concurrent application for Patent No. 115,302 with the processes indicated above so that sodium thiosulfate is produced direct from hydrated carbonates or a mixture of anhydrous and hydrated carbonates of sodium, sulfur dioxid and sulfur.

Several examples for carrying out our invention will now be described:—

When the sodium sulfite is not available sufficiently cheaply, we prefer to prepare the sodium sulfite from sodium bisulfite and soda ash as described in our concurrent application for Patent No. 115,302.

In order to prepare the mixture of sodium sulfite and sulfur for digestion, an intimate mixture of sulfur and soda ash is added gradually to the requisite amount of water with constant agitation. This simplifies the preparation of a uniform mixture of sulfur and sodium carbonate solution. The bisulfite is then added gradually.

The quantities of the above mentioned substances may be adjusted to the theoretical proportions, or so as to leave a small excess of sulfite or sulfur or both over and above that required to form, when digested hot, a solution of sodium thiosulfate of sufficient concentration to be commercially crystallizable on cooling, without evaporation: with such high concentrations of sodium thiosulfate we find, as before stated, that practically the whole of the excess of sulfite separates out while hot and does not affect the crystallization of the thiosulfate.

The digestion takes place rather slowly, but by suitably adjusting the time of contact of the reacting substances, a solution of sodium thiosulfate may be prepared of such a concentration that any desired amount of crystallization will take place on cooling without previous evaporation. The length of this time of contact may be materially reduced by the addition of a small amount of other substances, such as the hydrates or sulfids of the alkali or alkaline earth metals, which substances materially accelerate the reaction. This addition may cause the presence of small amounts of sulfids or polysulfids in the resulting sodium thiosulfate solution. These may be removed by treatment with sulfurous acid or a bisulfite.

As an example of the carrying out of the process, we take quantities of anhydrous sodium sulfite and sulfur such that the sulfur is in excess by about 5 per cent. of the theoretical quantity required for the formation of sodium thiosulfate. These are added to sufficient water to form a 50 to 60 per cent. solution of the sodium thiosulfate when digested in a steam jacketed vessel. The reaction may occupy 30 to 40 hours. The time of reaction may be reduced to 15 to 20 hours by the addition of about 1 per cent. or less by volume of an alkaline solution of sodium sulfid prepared by heating a concentrated solution of caustic soda with an excess of sulfur. At the end of the reaction, the mass is blown with sulfur dioxid gas or treated with solid sodium bisulfite until the whole of the sulfid present is decomposed. The solution is then separated by any convenient method, such as filtration by vacuum filter or hydro-extractor, and run into crystallizers. The solid residue is returned to the digester and used in the next charge.

According to a modification, we employ a large excess of one or other of the reagents, sodium sulfite and sulfur so as to form a magma or paste.

In the case in which sulfur only is in excess, this is conveniently effected by adding to a known quantity of water sufficient sodium sulfite to form a concentrated solution of sodium thiosulfate when digested with the theoretical proportions of sulfur and to this mixture a large excess of sulfur is added, sufficient to form a pasty mass. The greater the excess of sulfur, the more rapidly the reaction proceeds. The mixture is then digested hot, at say 60 to 100 degrees centigrade, in a steam jacketed vessel with mechanical agitation, when the whole of the sodium sulfite is rapidly converted into sodium thiosulfate, a concentrated solution of the latter being formed in a short time, about two hours or less. The solution is then separated by any convenient method, such as filtration by vacuum filter or hydro-extractor, and run into crystallizers. The solid residue is then returned to a digester and used in the next charge.

Or, instead of adding a large excess of sulfur, we add a large excess of sodium sulfite and thus utilize the whole of the sulfur. Owing to the fact that sulfite is practically insoluble in a sodium thiosulfate solution of high concentration, the presence of the excess of sulfite does not affect the crystallization of the thiosulfate.

If a large excess of both sodium sulfite and sulfur be used, a saturated solution of thiosulfate is obtained together with an amount of solid di-hydrated sodium thiosulfate, depending upon the time of digestion and the relative amounts of sulfite and sulfur present. At the end of the reaction water is added to bring the solution down to the concentration required for crystallization. It has been demonstrated by us that most common impurities such as common salt, sodium sulfate and sodium carbonate are practically insoluble in a hot concentrated sodium thiosulfate solution; this property of the solution makes it possible to prepare pure sodium thiosulfate by our method from impure sodium sulfite from various sources. No special treatment is needed, the impurities separating out as the concentration of the thiosulfate increases.

We are thus enabled to utilize the crude sodium sulfite formed as a by-product in the preparation of various organic substances, notably synthetic phenol, or sulfite prepared from crude alkali or alkali liquor by the method described in the specification accompanying our concurrent application for Patent No. 115,302.

According to another example the removal of soluble and insoluble impurities without loss of sulfite or sulfur is rendered possible by using excess of one and the other of these substances alternately. When excess of sulfite is used, the residual salt together with soluble impurities is washed out of the insoluble matter left after filtration and used again. When excess of sulfur is used the soluble impurities are washed out of the sulfur which is left after filtration with the insoluble impurities and used again.

In another form of process according to this invention, the excess of the reagents is utilized to give a continuous process.

In this a hot saturated solution of sodium sulfite is passed through an intimate mixture of solid anhydrous sodium sulfite and sulfur, the vessel or vessels in which the reaction takes place being maintained at a temperature of say between 60 and 100 degrees centigrade. By suitably adjusting the quantities of the solid reagents in the apparatus and the rate of flow of the sulfite solution, a solution of sodium thiosulfate can be withdrawn continuously of such a concentration that it will crystallize when cooled, without previous evaporation.

This continuous process may be carried out in an apparatus such as illustrated diagrammatically in the accompanying drawing, in which $a$ designates the tower or vessel in which a mixture of solid sodium sulfite and powdered sulfur of the requisite proportions to form sodium thiosulfate is placed, the mixture occupying preferably about one-half the volume of the vessel. The sodium sulfite solution is fed into the apparatus from a tank or reservoir *b* by way of the pipe *c*, the level of the liquid in the vessels *a* and *d* being maintained at the height of the overflow pipe *e*. The vessel *d* has a louvered baffle plate *f* therein which directs any solid matter coming from the vessel *a* to the vessel *d* by way of the pipe *g*, to the bottom of the vessel *d*, while allowing of the free passage of the liquid to the interior of the vessel *d*. A rotary pump *h* in the pipe or conduit *i* serves to circulate the liquid from the vessel *d* to the vessel *a* and back to *d* by way of the pipe *g*.

The operation proceeds as follows: The vessel *a* being charged with the solid reagents as aforesaid, the hot sulfite solution in the tank *b* is admitted to the apparatus until the liquid level is substantially that of the overflow pipe *e*. The liquid control valve *j* is then closed and the pump *h* caused to circulate the liquid through the apparatus in a direction from the vessel *d* to the vessel *a*. The upper part of the vessel *a* and the whole of the vessel *d* serve as clarifying or settling spaces. Any solid matter circulated from *a* to *d* is directed into the pipe *i* and is returned to the vessel *a* by the pump. The circulation is continued until the sulfite solution is converted into a thiosulfate solution of the required strength. Further sulfite solution is then admitted continuously into the system by way of the pipe *c* so that it passes directly through any solid in *a* and causes the thiosulfate solution to overflow at *e*. The rate of inflow of the sulfite is so adjusted as to cause the outflow of a liquid of constant concentration; this liquid is filtered and crystallized. The amount of the mixture of solid sulfite and sulfur is maintained by placing further supplies in the vessel *a* at intervals through the top of the vessel *a*.

The dimensions of the apparatus are determined by the rate at which it is desired to produce the thiosulfate. For a minimum production at the rate of one-half ton of thiosulfate per hour, the quantity of the solid mixture in the towers should not be less than one ton, or twice the amount equivalent to the thiosulfate production per hour. This allows for a two hours' reaction. It is preferable to work with quantities of the solid materials in excess of the minimum requirement for the rate of production. For the above minimum production the vessels *a* and *d* may be of four feet diameter and 10 feet high including the conical base. The tank or reservoir *b* may contain any convenient amount of the sulfite solution; 2,500 gallons would amply maintain the required supply for 24 hours, assuming the production of thiosulfate to be one-half ton per hour (of $Na_2S_2O_3.5H_2O$) in the form of a 50 per cent. solution. The vessels *a* and *d* may be steam jacketed to maintain their contents at a temperature of from 60 to 100 degrees centigrade. Suitable control valves may be provided upon the apparatus to suit requirements.

We do not limit ourselves to any particular form or arrangement of the apparatus for carrying out the continuous process but may modify same to suit requirements.

It will of course be understood that the sulfur is utilized in all cases in a powdered condition in order to expedite the rate of reaction.

By the use of our invention, the preparation of a concentrated solution of thiosulfate from sulfur and sodium sulfite without any process of evaporation is rendered practicable. Further, the acceleration of the reaction permits of the formation of a concentrated thiosulfate solution by a single process in a continuous and automatic manner.

Claims:

1. A process for the production of sodium thiosulfate by the action of sulfur upon sodium sulfite in which the relative masses of the reacting substances and water are proportioned to form by digestion a sodium thiosulfate solution sufficiently concentrated, without evaporation, to allow of commercial separation by crystallization, as set forth.

2. A process for the production of sodium thiosulfate in which there is employed a large excess of at least one of the reagents sodium sulfite and sulfur beyond the theoretical quantity required for the formation of sodium thiosulfate, whereby the reaction is accelerated, concentrated solutions are produced and impurities precipitate out from the hot concentrated solutions, as set forth.

3. A process for the production of sodium thiosulfate by the action of sulfur upon sodium sulfite, in which an excess of sodium sulfite and sulfur is employed alternately to enable the removal of soluble and insoluble impurities alternately and prevent loss of reagents, as set forth.

4. A process for the continuous production of sodium thiosulfate, comprising passing a hot sodium sulfite solution through an intimate mixture of solid sulfite and sulfur, as set forth.

In testimony whereof we have signed our names to this specification in the presence of two subscribing witnesses.

THOMAS WILLIAM STAINER HUTCHINS.
LUKE HARGREAVES.
ALFRED CHARLES DUNNINGHAM.

Witnesses:
ARTHUR HUGHES,
HILDA HUGHES.